United States Patent [19]

Chang

[11] Patent Number: 4,666,646

[45] Date of Patent: May 19, 1987

[54] METHOD OF PRODUCING HIGH-DENSITY PU FOAM MATERIAL

[76] Inventor: Kun H. Chang, No. 45, Shuang Hu, Shuang Hu Ts'un, San Yih Hsiang, Miaoli Hsien, Taiwan

[21] Appl. No.: 758,457

[22] Filed: Jul. 24, 1985

[51] Int. Cl.$^4$ .................... B32B 5/16; B32B 5/20
[52] U.S. Cl. ................... 264/109; 264/41; 264/DIG. 7; 264/DIG. 69
[58] Field of Search ........ 264/DIG. 7, 109, DIG. 69, 264/41

[56] References Cited

U.S. PATENT DOCUMENTS 3,354,578  11/1967  Ryan ............................ 264/DIG. 7
3,401,128   9/1968  Terry ........................... 264/DIG. 7
3,452,122   6/1969  Stern et al. .................... 264/DIG. 7
3,517,414   6/1970  Carson, Jr. .................... 264/DIG. 7

Primary Examiner—Philip Anderson
Attorney, Agent, or Firm—Browdy and Neimark

[57] ABSTRACT

The present invention relates to a method of producing high-density PU foam material, which is characterized by its process of using comminuted waste foam material, as its primary raw material which is then dried and filtered before mixing with other chemical agents in proportion, such as Voranol 3800 polyo, Isocyanate and relatively small amount of Catalysts to make the individual particle and also those agents between particles to swell to proper size in mold. Then, the yet foamed material is compressed in a mechanical way and cooled down slowly in natural manner to produce high-density PU foam material.

8 Claims, 1 Drawing Figure

METHOD OF PRODUCING HIGH-DENSITY PU FOAM MATERIAL

DESCRIPTION OF DRAWING

For a clear demonstration, a flow chart of the subject method is drawn in FIG. 1.

DETAILED DESCRIPTION

Figure 1:
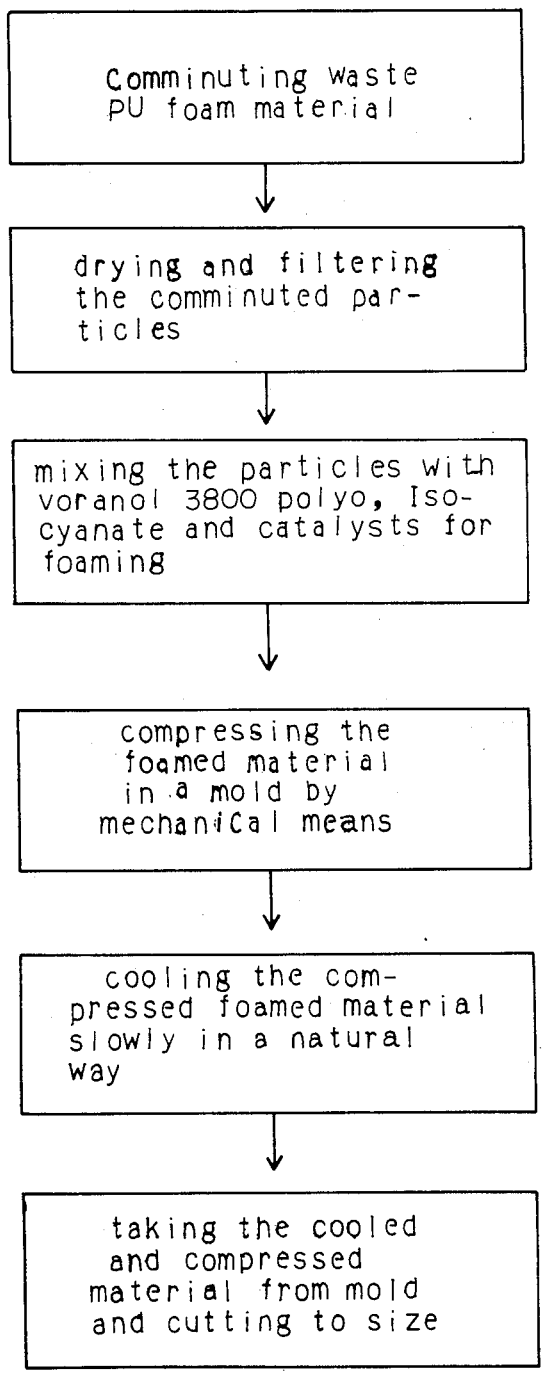

The present invention relates to a process for producing soft foam material, and particularly to a method for producing high-density PU (polyurethane) foam material.

For comparison, two commonly-used methods in producing PU foam material are briefed as below:

(1) a so-called one-shot method is used by first mixing diisocyanate, polyol, catalyst, water and other additives in proportion and immediately injecting the mixed agents into mold for foaming.

(2) a so-called prepolymer method is used by first mixing diisocyanate and polyol to obtain a chemical agent prepolymer through chemical reaction, then blending prepolymer with catalyst and swelling agent to produce the foam material.

Having low or medium density of 18–30 kg/m$^3$, the products of the above methods can only be used as common packing or scrubing material on account of their relatively poor resilience.

High-density PU foam material is more widely and valuably used as cushioning material in shoes or as lining in hats with good sanitary effect due to its fair air-permeability and resilient property.

The present invention provides an improved method of producing high-density PU foam material by using comminuted waste of PU foam as raw material, which resolves the usual problem of using too much liquid raw material inefficiently. The comminuted PU foam is first dried by heat, permitting the comminuted particles to absorb more down-stream resins.

The present method also filters the comminuted particles to keep them of even size for better product quality.

Another feature of the subject method is the exertion of constant pressure under which the yet foamed material confined in the mold is put to keep foamed particles to proper size. The mold is then cooled slowly down in a natural manner.

To faciliate understanding of the features of the subject method, an example is presented in the following, referring to FIG. 1:

(a) comminuting 100 kg waste PU foam material first;

(b) placing the comminuted particles in a drier, then filtering the particles for even size;

(c) blending and distributing the comminuted particles with 25 kg Voranol 3800 polyol, 12.5 kg isocyanate and 0.32 kg Catalysts in a mixer (about 30 minutes). Meanwhile, those particles impregnated with the agents of Voranol 3800 polyol and isocyanate begin to swell along with those agents between particles to bind the whole material toegether, resulting in the volume of the foam material expanding 5 times as large as its original one.

(d) compressing the expanded material in a mold by mechanical means and cooling it down in natural manner in 24 hours, then taking it out and cutting to size to get foamed product of density about 58–60 kg/m$^3$.

The filtered and comminuted particles of size 0.5 m/m–3.0 m/m are foamed and bound to form the product of density 178 kg/m$^3$ with air permeability 200 l/m$^2$ sec.

I claim:

1. A method of making a high-density polyurethane foam, comprising the steps of:

pulverizing a previously formed polyurethane foam to obtain particles having a size of 0.5 mm–3 mm;

drying said particles;

mixing said dried particles with a polyurethane-forming composition including a polyol and a diisocyanate compound to form a mixture;

placing said mixture within a mold;

compressing said mixture with said mold;

cooling said compressed mixture with said mold; and releasing said compressed and cooled mixture from said mold.

2. A method as claimed in claim 1, wherein said previously formed polyurethane foam is waste polyurethane foam.

3. A method as claimed in claim 1, wherein the polyurethane-forming composition consists essentially of polyol, diisocyanate, a catalyst and additives.

4. A method as claimed in claim 2, wherein the polyurethane-forming composition consists essentially of polyol, diisocyanate, a catalyst and additives.

5. A method as claimed in claim 1, further comprising the step of screening the pulverized particles before mixing.

6. A method as claimed in claim 2, further comprising the step of screening the pulverized particles before mixing.

7. A method as claimed in claim 3, further comprising the step of screening the pulverized particles before mixing.

8. A method as claimed in claim 4, further comprising the step of screening the pulverized particles before mixing.

* * * * *